(12) United States Patent
Alberth, Jr. et al.

(10) Patent No.: US 9,135,770 B2
(45) Date of Patent: Sep. 15, 2015

(54) PREDICTION OF AN ESTIMATED REMAINING UTILITY USAGE VIA METER AND ADJUSTING AN ALERT THRESHOLD

(71) Applicant: Motorola Mobility LLC, Libertyville (IL)

(72) Inventors: William P. Alberth, Jr., Prairie Grove, IL (US); Howard P. Benn, Swindon (GB); John P. Cipolla, Inverness (IL)

(73) Assignee: Google Technology Holdings LLC, Mountain View, CA (US)

( * ) Notice: Subject to any disclaimer, the term of this patent is extended or adjusted under 35 U.S.C. 154(b) by 172 days.

(21) Appl. No.: 13/621,857

(22) Filed: Sep. 18, 2012

(65) Prior Publication Data

US 2014/0077968 A1    Mar. 20, 2014

(51) Int. Cl.
  *G08B 21/00*  (2006.01)
  *G07F 15/10*  (2006.01)
(52) U.S. Cl.
  CPC ....................................... *G07F 15/10* (2013.01)
(58) Field of Classification Search
  CPC ....................................................... G07F 15/10
  USPC ........................... 340/870.02; 705/34, 38, 412
  See application file for complete search history.

(56) References Cited

U.S. PATENT DOCUMENTS

2004/0117330 A1   6/2004   Ehlers et al.
2008/0154624 A1   6/2008   O'Neil
2010/0127889 A1   5/2010   Vogel et al.
2010/0198423 A1   8/2010   Hirst
2010/0198713 A1   8/2010   Forbes, Jr. et al.

FOREIGN PATENT DOCUMENTS

JP        2003333200 A        11/2003

OTHER PUBLICATIONS

Patent Cooperation Treaty, "PCT Search Report and Written Opinion of the International Searching Authority" for International Application No. PCT/US2013/060170 dated Dec. 5, 2013, 8 pages.
First Choice Power, http://www.firstchoicepower.com/plans-services/electricity-plans/variable-rate-electricity-plans.aspx, Jun. 4, 2012, all pages.
Your Choice Your Plan—GreyStone Power Corporation, http://www.greystonepower.com/UploadedFiles/pdf/prepaid%20brochure.pdf, Jun. 4, 2012, all pages.

(Continued)

*Primary Examiner* — Jeffery Hofsass
(74) *Attorney, Agent, or Firm* — Leydig, Voit & Mayer, Ltd.

(57) ABSTRACT

A method and system for predicting an estimated remaining utility usage and adjusting an alert threshold for a prepaid utility meter account includes receiving an indication of a time period of inaccessibility to replenish a prepaid utility meter account, predicting an alert trigger time when an estimated remaining utility usage for the prepaid utility meter account falls below an alert threshold, and determining that the time period of inaccessibility overlaps the predicted alert trigger time, and responsively adjusting the alert threshold such that the predicted alert trigger time occurs before the time period of inaccessibility. The method also includes receiving an indication of a business objective for a utility company and automatically adjusting the alert threshold associated with the prepaid utility meter account based on the business objective.

16 Claims, 5 Drawing Sheets

(56) References Cited

OTHER PUBLICATIONS

How Does Prepaid Electricity Work, http://www.mxenergy.com/does-prepaid-electricity-work-a-19.html, Jun. 4, 2012, all pages.

International Bureau of WIPO, International Preliminary Report on Patentability in International Patent Application PCT/US2013/060170 (Mar. 24, 2015).

EDF Energy, Presentation; "Pay as you go".

PREDICTION OF AN ESTIMATED REMAINING UTILITY USAGE VIA METER AND ADJUSTING AN ALERT THRESHOLD

FIELD OF THE DISCLOSURE

The present disclosure relates generally to prepaid utility meter accounts and more particularly to estimating the remaining utility usage and adjusting the alert threshold for prepaid utility meter accounts.

BACKGROUND

The concept of prepaid utility service was initially developed in South Africa in the late 1980s as a means of providing energy to geographically dispersed users with limited financial wealth. The idea proved successful, and prepaid utility meters quickly saw widespread use in other developing countries such as India, China, Turkey, and Argentina, just to name a few. Today, prepaid utility meters enjoy significant popularity in affluent countries as well. The reason for this is the many benefits that prepaid utilities provide.

Because prepaid meters automatically block and resume utility service as prepaid accounts are depleted and then replenished, utility companies do not incur the cost associated with repeated "truck rolls" to disconnect and reconnect service. Utility companies can also reduce collection costs and improve cash flow because payment is received in advance of service.

Utility users also report positive experiences with prepaid service. Users can more closely monitor their utility consumption and adjust their use accordingly. Budgeting is easier because prepaid service does not require lump-sum payments. Landlords similarly favor prepaid utility meters. By ensuring tenants are paying for their utility use, for example, landlords do not get stuck with large unpaid bills at the end of a lease.

However, despite significant advancements made in the area of prepaid metering technology, the use of prepaid utility meters still holds challenges for consumers, particularly in the area of account management. Users must anticipate their rate of consumption and ensure accounts are replenished to avoid disruptions in service. In some instances, periods of absence, such as vacations, can complicate account management efforts. It is in this area that improvements to the state of the art are possible.

Accordingly, there is a need for a method and system for predicting an estimated remaining utility usage and adjusting an alert threshold for a prepaid utility meter account.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
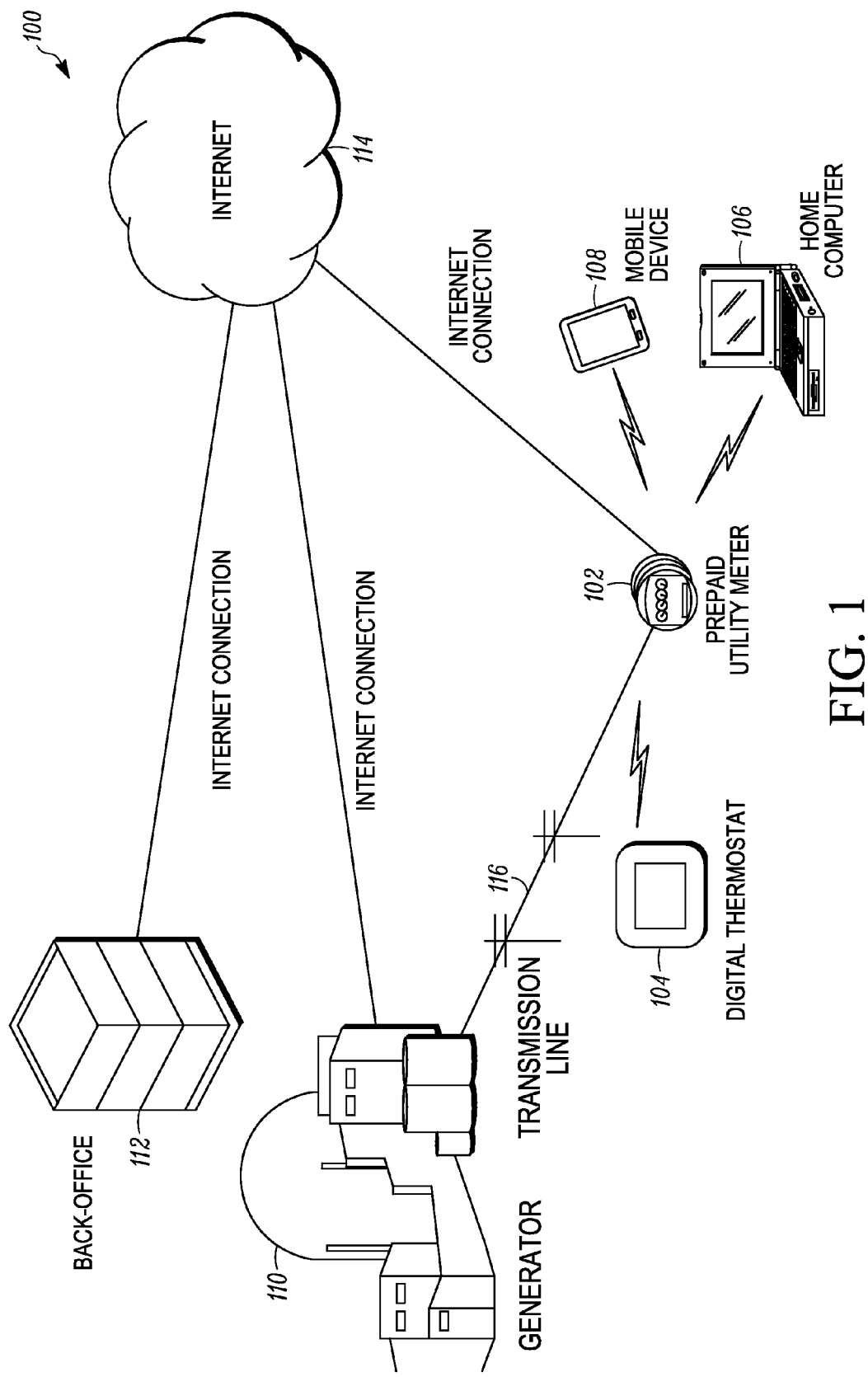
FIG. 1 illustrates a prepaid utility meter system in accordance with an embodiment of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for predicting and estimating remaining utility usage and adjusting an alert threshold for a prepaid utility meter account. In accordance with the teachings herein, a method performed by a utility device for automatically adjusting an alert threshold for a prepaid utility meter account comprises: receiving an indication of a time period of inaccessibility to replenish a prepaid utility meter account, and predicting an alert trigger time when an estimated remaining utility usage for the prepaid utility meter account falls below an alert threshold. The method additionally comprises determining that the time period of inaccessibility overlaps the predicted alert trigger time and responsively adjusting the alert threshold such that the predicted alert trigger time occurs before the time period of inaccessibility.

In one embodiment, the method further comprises: receiving an indication of a business objective for a utility company associated with the prepaid utility meter account, wherein the business objective comprises increasing revenue for a current accounting period; and adjusting the alert threshold so that the predicted alert trigger time occurs within the current accounting period.

In another embodiment, the method comprises: receiving an indication of a business objective for a utility company associated with the prepaid utility meter account, wherein the business objective comprises shifting revenue to a next accounting period; and adjusting the alert threshold so that the predicted alert trigger time occurs within the next accounting period.

Also in accordance with the teachings herein is a method performed by a utility device for automatically adjusting an alert threshold for a set of prepaid utility meter accounts that comprises receiving an indication of a business objective for a utility company. The method further comprises determining a set of prepaid utility meter accounts serviced by the utility company, each of which is associated with an alert threshold that is used to trigger an automated alert message to replenish the prepaid utility meter account when an estimated remaining utility usage falls below the alert threshold, and automatically adjusting the alert threshold associated with each prepaid utility meter account in the set based on the business objective for the utility company.

In a particular embodiment, wherein the estimated remaining utility usage is determined based on forecasted weather, the method further comprises increasing a first alert threshold in response to an indication of a period of absence of at least one occupant from a location associated with a first prepaid utility meter account, so that an automated message to replenish the first prepaid utility meter account is sent before the period of absence.

Further in accordance with the teachings herein is a utility system for automatically alerting a user associated with a prepaid utility service comprising an interface configured to receive an indication of a set of usage prediction events and a set of future events. The system additionally comprises a processing device configured to: estimate a remaining time period of prepaid utility usage associated with the prepaid utility service, wherein the estimating is based on the set of usage prediction events; determine an alert threshold based on the set of future events; and initiate an automated alert to the user when the estimated remaining time period of prepaid utility usage falls below the determined alert threshold.

Referring now to the drawings, and in particular FIG. 1, a system associated with a prepaid utility meter account implementing embodiments in accordance with the present teachings is shown and indicated generally at 100. System 100 comprises: a prepaid utility meter 102, a digital thermostat 104, a home computer 106, a mobile device 108, such as a cell phone, a generator 110, a back-office 112, the Internet 114, and a transmission line 116. Additionally, FIG. 1 shows links or connections that communicatively couple the digital thermostat 104, the home computer 106, and the mobile device 108 to the prepaid utility meter 102, and also communicatively couple the prepaid utility meter 102, the generator 110, and the back-office 112 to the Internet 114. In an embodiment, these connections will interface with one or more routers located with the prepaid utility meter 102, the back-office 112, the generator 110, and also within the Internet 114. Only a limited number of system elements 102-116 are shown for ease of illustration, but additional such elements may be included in the system 100. Moreover, other components that may be needed for a commercial embodiment of the system 100 are omitted from the drawing for clarity in describing the enclosed embodiments.

We turn now to a brief description of the system elements that are shown in FIG. 1. In general, the prepaid utility meter 102, and in some embodiments, the back-office 112, the digital thermostat 104, the home computer 106 and/or the mobile device 108, are adapted with functionality in accordance with embodiments of the present disclosure as described in detail below with respect to the remaining figures. "Adapted," "operative" or "configured" as used herein means that the indicated elements are implemented using one or more (although not shown) memory devices, network interfaces, and/or processing devices that are operatively coupled. The memory devices, network interfaces, and/or processing devices, when programmed, form the means for these system elements to implement their desired functionality.

The processing devices utilized by the elements of system 100 may be partially implemented in hardware and, thereby, programmed with software, firmware logic or code for performing functionality described by reference to FIGS. 2-5; and/or the processing devices may be completely implemented in hardware, for example, as a state machine or ASIC (application specific integrated circuit). The memory implemented by these system elements can comprise short-term and/or long-term storage of information needed for the functioning of the respective elements. The memory may further store software or firmware for programming the processing devices with the logic or code needed to perform their functionality.

The network interfaces are used for passing signaling, also referred to herein as messaging (e.g., messages, packets, datagrams, frames, superframes, and the like), containing control information and data between elements of the system 100. The implementation of a network interface between any two particular devices depends on the specific type of network, i.e., wired and/or wireless, to which the devices are connected. For example, a network interface that supports wired links and communications is referred to herein as a wired interface, and a network interface that supports wireless links and communications is referred to herein as a wireless interface. In the example implementation shown in FIG. 1, the prepaid utility meter 102 contains a wireless interface to attach to a wireless network such as the Internet 114 and contains a wired interface to connect the generator 110. Examples of wired interfaces include Ethernet, T1, USB interfaces, etc. Examples of wireless interfaces include wireless protocols and associated hardware that support technologies including, but not limited to, Long Term Evolution (LTE), Code Division Multiple Access (CDMA), Global System for Mobile Communications (GSM), Wi-Fi, Institute of Electrical and Electronics Engineers (IEEE) 802.11, Bluetooth®, etc.

Where the system 100 supports wireless communications, the network interfaces comprise components including processing, modulating, and transceiver (i.e., radio) components that are operable in accordance with any one or more standards or proprietary air interfaces, wherein some of the functionality of the processing, modulating, and transceiver components may be performed by means of the processing device through programmed logic such as software applications or firmware stored on the memory device of the system element or through hardware.

Proceeding with the brief description of the system elements shown in FIG. 1, the prepaid utility meter 102 (also referred to herein as a utility meter), which is associated with a prepaid utility meter account (also referred to herein as a utility account or account), regulates the flow of a utility to a location (such as a home or business) being serviced by a utility company. The prepaid utility meter 102 being associated with a prepaid utility meter account means that the meter 102 and the account are related or identified as being related in one or more records kept by the utility company. For example, a record with the utility company can associate a utility user, a utility meter 102 (as identified by a meter identifier), and a location being serviced by the utility company (as specified by an address) with a prepaid utility meter account. The utility company provides prepaid utility service by providing the flow of utility that is regulated by the utility meter 102. In a particular embodiment, multiple utility companies are associated with a prepaid utility meter account. For example, this might be the case where one utility company provides a flow of utility to the prepaid utility meter 102 while another utility company handles the billing for the prepaid utility meter account associated with the meter 102.

Examples of utilities to which the present teachings may be applied include gas, electric, data services, data delivery, and water. In a particular embodiment, the utility meter 102 continues to allow the utility to flow while credit or funds remain in the prepaid utility meter account associated with the meter 102. Upon exhausting the utility account's credit, the utility meter 102 stops the flow of the utility to the location being serviced until such time as credit is restored to the account. Recharging or replenishing the utility account (meaning adding credit or funds to the account) before it runs out avoids disruptions in service. In a particular embodiment, a processing device that performs functionality described herein is included in a prepaid utility meter used to regulate the prepaid utility service. In an alternate embodiment, the processing device is included in the back-office 112 of the utility company that provides the prepaid utility service.

The digital thermostat 104, home computer 106, and mobile device 108 shown in FIG. 1 aid the utility meter 102 in performing its functionality. The devices 104-108 are communicatively coupled to the utility meter 102 (and in some embodiments, each other), allowing the meter 102 to receive and pass data and control signals from and to the devices 104-108. The manner in which the devices 104-108 are communicatively coupled to the utility meter 102 can vary. In one embodiment, for example, the utility meter 102 has a direct physical connection (i.e., is wired) to the digital thermostat 104, while the meter 102 connects with the mobile device 108 over an LTE communications network. In this same embodiment, the utility meter 102 and the home computer 106 are both joined to the same local area network (LAN) through a router that allows them to communicate using wired (e.g., category 5 cable) and/or wireless (e.g., IEEE 802.11 protocol) connections.

In a different embodiment, the utility meter 102 and devices 104-108 employ machine-to-machine (M2M) communication standards, as defined by the European Telecommunications Standards Institute (ETSI), to capture and relay events such as temperature or calendar entries, for example. In yet another embodiment, the utility meter 102 uses a medium- or short-range radio frequency (RF) link (e.g., the 900 MHz or 2.4 GHz Industrial, Scientific and Medical (ISM) bands) to communicatively couple with some or all of the devices 104-108. Examples of viable 2.4 GHz communication standards include both Bluetooth® and ZigBee®.

The generator 110 and the back-office 112 together represent a utility company that services (i.e., provides a utility service to) the location associated with the prepaid utility meter 102. The back office 112 maintains prepaid utility meter accounts, keeps records for those accounts, and coordinates with the prepaid utility meters associated with those accounts. The generator 110 supplies utility to the prepaid utility meters at the locations being serviced. In the case where the utility is electricity, the generator 110 furnishes the meter 102 with utility using the transmission line at 116. For natural gas or water, the means of transmission indicated at 116 comprises a pipeline.

The utility meter 102, back-office 112, and generator 110 are all communicatively coupled to each other by links that each connect to a common network 114, or more particularly to one or more devices within the network 114. As shown in FIG. 1, the network 114 is the Internet (which includes multiple routers (not shown) used to route information through the network 114). In one embodiment, the devices that terminate the links use internet protocol (IP) for communicating information. In another embodiment, secure connections are used to send information over the links. In a further embodiment, the network at 114 represents a private network used by the utility company.

Figure 2:
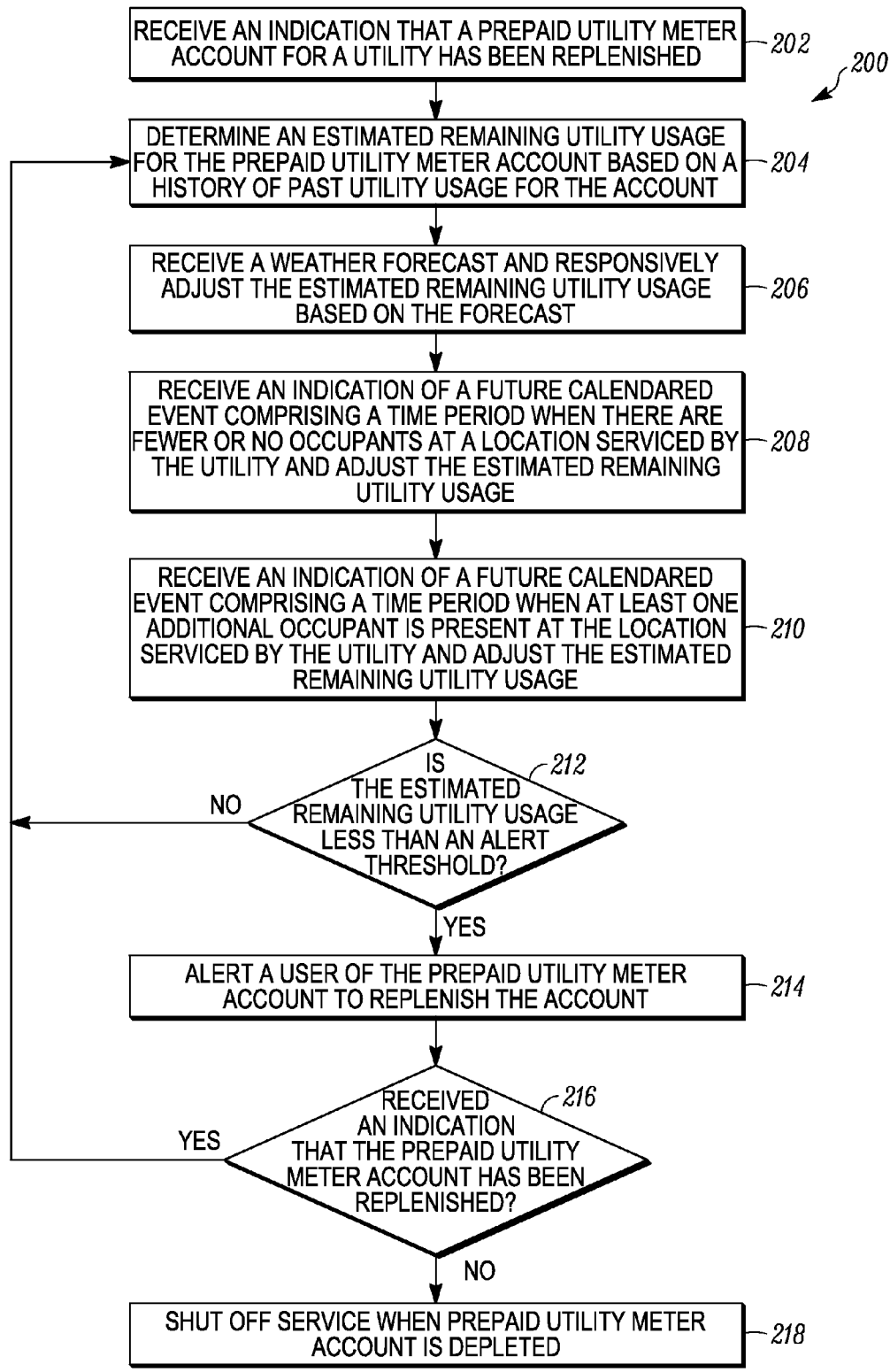
FIG. 2 is a logical flowchart illustrating a method for determining and adjusting an estimated remaining utility usage for a prepaid utility meter account used to trigger a user alert, in accordance with an embodiment of the present teachings.

We turn now to a detailed description of the functionality of the system 100 elements in accordance with the teachings herein and by reference to the remaining figures. FIG. 2 shows a logical flow diagram at 200 illustrating a method for determining and adjusting an estimated remaining utility usage for a prepaid utility meter account used to trigger a user alert in accordance with an embodiment of the present teachings. The estimated remaining utility usage, which is also referred to herein as a remaining time period of prepaid utility usage, is an estimation of the length of time the credit for a prepaid utility meter account will last. The actual length of time the credit for a prepaid utility meter account lasts depends on how quickly a utility is consumed. Therefore, an accurate estimation of remaining utility usage involves knowledge of future consumption rates (i.e., consumption rates that will occur in an upcoming time period).

The algorithm shown in FIG. 2 allows a processing device, located at the utility meter 102 or back-office 112, to estimate a remaining time period of prepaid utility usage associated with a prepaid utility service based on a set of usage prediction events. A set, as used herein, can contain one or more elements. A "usage prediction event" is defined as an event, factor, or occurrence (whether past or future) that is used to predict a future utility use pattern. A weather forecast, for example, is a future occurrence and a usage prediction event that provides information on the rate at which a utility is likely to be consumed based on an anticipated type of weather. An expected cold front, for instance, is likely to lead to increased gas consumption by a furnace to maintain a residence serviced by the gas company at a comfortable temperature. In this instance, the usage prediction event is not an assurance of increased utility usage, only that it is more likely than not. Inherent in the previous example is the possibility that the expected cold front will dissipate or be redirected so the increase in utility usage never materializes. An example of a past occurrence that is a usage prediction event is a history of past utility usage that is used to predict future utility usage.

In a particular embodiment, the set of usage prediction events comprises at least one of: a weather forecast, a calendared event comprising an upcoming time period of absence of at least one occupant from a location serviced by the utility system, a calendared event comprising an upcoming time period when at least one additional occupant is present at the location serviced by the utility system, or a history of past utility usage for the location being serviced by the utility system. FIG. 2 provides an example of an algorithm where the processing device of the prepaid utility meter system 100 uses all the usage prediction events identified above to determine the estimated remaining utility usage. Other algorithms may use more or fewer types of usage prediction events to estimate remaining utility usage for a prepaid utility meter account.

At 202, the processing device receives an indication that a prepaid utility meter account associated with a utility user (also referred to herein as an account holder) has been replenished. Replenishing (i.e., refilling) the utility account comprises adding monetary credit to the account to make more utility available for use and to avoid a disruption in service, which occurs in some embodiments at a zero balance. Other embodiments allow the utility user to tap a reserve amount of utility in the event that a zero account balance is reached, or in the event local laws require that essential utility services are provided in harsh weather conditions like extreme cold or extreme heat.

At 204, the processing device determines the estimated remaining utility usage based on past utility usage patterns associated with the prepaid utility meter account. More particularly, the prepaid utility meter system 100 accesses stored past utility usage patterns for the purpose of enabling the processing device to calculate the estimated remaining utility usage. Past utility usage is utility usage that occurred prior to the processing device determining the estimated remaining utility usage. In a simple embodiment, the processing device divides a past amount of utility used by the period of time over which it was used to obtain a rate of past utility usage. The processing device then takes the current amount of utility for which there is credit in the prepaid utility meter account and divides it by the rate to determine the estimated remaining utility usage.

In other embodiments, the processing device makes more sophisticated calculations to determine remaining usage. For example, the processing device uses past utility usage patterns that relate to the present time. If the current month is July, the processing device avails itself of July (or summer) usage data from previous years. In an embodiment, the processing device also factors into its calculation specific usage patterns that repeat for certain portions of the month. If, historically, utility usage is higher over the weekends, this is reflected in the estimated remaining utility usage calculation.

For some embodiments, the estimated remaining utility usage is also determined based on forecasted weather. At 206, the processing device receives a weather forecast and responsively adjusts the estimated remaining utility usage based on the forecast. In one embodiment, the processing device receives forecasted temperature data from the back-office 112 of the utility company, which uses the data to predict loads placed on the generator 110. Climate control efforts generally increase utility consumption rates as the temperature differential grows between the temperature set on the indoor thermostat 104 and the outside temperature. In another embodiment, the processing device downloads weather forecasts from the Internet 114. The processing device then uses forecasted weather data to arrive at a more accurate prediction of the estimated remaining utility usage. If, for example, the following week of the current month of July is expected to be significantly hotter than it was for July of the previous year, then the estimated remaining utility usage predicted using usage patterns from the previous year can be improved upon.

In further embodiments, the processing device also considers future calendared events in estimating the remaining utility usage. A "future calendared event" is defined herein as a scheduled occurrence (such as a utility user scheduled occurrence) that is likely to affect the rate at which a utility is consumed. For one embodiment, an indication of at least one future calendared event is obtained by interfacing with a mobile device of a user associated with the prepaid utility meter account. For example, where the processing device is included in the prepaid utility meter 102, the meter can interrogate the mobile device 108 or wearable computer for future events the utility user has calendared on the device 108. The utility meter 102 can also interrogate the home computer or a computer within a personal transportation vehicle, for example, shown at 106 in FIG. 1 to obtain indications of future calendared events. In an embodiment, a smart phone 108 and/or the home computer 106 run applications that allow the prepaid utility meter 102 to access certain information, such as the utility user's calendar information. The utility meter 102 interfacing with a device means the meter establishes a communicative connection with the device for the purpose of communicating data and/or control signals.

For another embodiment, an indication of at least one future calendared event is downloaded from the Internet 114. Where permissions allow, the processing device, using either the connection between the utility meter 102 and the Internet 114 or the connection between the back-office 112 and the Internet 114, depending on whether it is located at the utility meter 102 or the back-office 112, can access one or more calendars kept by the utility user online. In an embodiment, the processing device also employs data mining techniques to extract future calendared events from the Internet.

For a particular embodiment, the estimated remaining utility usage is determined based on a future calendared event comprising at least one of: a time period when there are fewer or no occupants at a location serviced by a prepaid utility meter associated with the prepaid utility meter account, or a time period when at least one additional occupant is present at the location serviced by the prepaid utility meter associated with the prepaid utility meter account. The processing device achieves a more accurate estimation of the remaining utility usage by adjusting a predicted utility consumption rate up or down depending on whether there will be more or fewer occupants, respectively, at the location associated with the prepaid utility meter account than there were when the historic usage pattern data was compiled.

At 208, the processing device receives an indication of a future calendared event comprising a time period when there are fewer or no occupants at a location serviced by the utility company and adjusts the estimated remaining utility usage. A determination of fewer (or additional) occupants is made, for example, relative to the number of occupants that normally reside at the location, relative to the number of occupants that resided at the location when past utility usage patterns were generated, or relative to a number of occupants that a utility user indicated to the utility company. The calendared event is a future event because it is scheduled to take place in the future relative to the time the processing device receives the indication of the event. Examples of future calendared events include dates for which the utility user is scheduled to: take a vacation, attend a multi-day seminar during a time he normally works from home, or receive house guests for an extended stay. Revisiting the previous example, if the calendar of a utility user who did not vacation last July indicates he will be vacationing this July, than it can be expected that less utility will be consumed this July as compared to last July. If historic usage data for last July is incorporated into an initial estimation of the user's current remaining utility usage, the processing device can improve upon that estimation by adjusting it downward to reflect the diminished usage while the user is away.

At 210, the processing device receives an indication of a future calendared event comprising a time period when at least one additional occupant is present at the location serviced by the utility company and adjusts the estimated remaining utility usage. In an embodiment, the processing device adjusts the estimated remaining utility usage downward in proportion to the number of additional guests indicated by the future calendared event and also to the length of time the additional guests are to remain at the location. In an embodiment, if the actual utility usage during the time period of the calendared event is recorded for later use as a past utility usage pattern, then the usage is normalized to compensate for the increased usage rate resulting from the additional guests. In this way, the same adjustment for the additional guests is not made twice, once implicitly at 204 and again explicitly at 210.

At 212, the processing device compares the estimated remaining utility usage to an alert threshold. The alert threshold serves as a low "watermark" (so to speak) that triggers the prepaid utility meter system 100 to provide notice (i.e., an alert) to the user associated with the prepaid utility meter account. The notice indicates to the user that his remaining account balance is low while there is sufficient time to replenish the balance before it is exhausted. How the system 100 sets and adjusts the alert threshold is indicated below by reference to FIG. 3.

When the comparison made at 212 results in the current estimated remaining utility usage being greater than or equal to the current alert threshold, no notice is sent to the user. Thus, the processing device proceeds to continuously update the estimated remaining utility usage by cycling through the actions indicated by 204-212. In different embodiments, the processing device makes periodic adjustments to the estimated remaining utility usage with different frequency. In one embodiment, the processing device only adjusts the estimated remaining utility usage as new data is obtained.

When the comparison made at 212 results in the estimated remaining utility usage being less than the alert threshold, referred to herein as the alert trigger time, the utility user is alerted at 214 to replenish his prepaid utility meter account. The prepaid utility meter system 100 communicates the alert to the utility user using one or more communication methods including, for instance: an e-mail, a short message service (SMS) text message, a phone call, or any combination thereof. In another embodiment, the user chooses the type of alert he receives and the information the alert contains. For example, the user selects notification via an e-mail that includes a predicted date that the remaining account balance will expire if not replenished. The user may even establish how frequently he receives additional alerts during the time period prior to replenishing the utility account.

To replenish the prepaid utility meter account, the user can, for example, use the home computer 106 to log onto an account management site maintained by the utility company and make a payment, mail a payment to a payment processing center, or physically remove the utility meter 102 and bring it to a repayment center to be replenished. In the first two cases, the utility company sends a signal over one or more internet connections to replenish the prepaid utility meter account balance at the meter 102 remotely. In a further embodiment, the alert comprises taking an affirmative action to replenish the prepaid utility meter account. For example, where authorization exists to automatically replenish a user's account, the system 100 withdraws funds from a user's debit account or charges a user's credit account at the alert trigger time.

After sending (214) the alert, the processing device waits, at 216, to receive an indication that the prepaid utility meter account has been replenished. In a particular embodiment, the system 100 sends the utility user periodic alerts until the user replenishes his account. When the account is replenished, the processing device updates the estimated remaining utility usage, at 204, to reflect the credit added to the account, and repeats actions 204-212 as previously described until the estimated remaining utility usage again falls below the alert threshold. If the prepaid utility meter account is not replenished before the account is depleted of credit, the prepaid utility meter 102 shuts off the flow of utility to the location being serviced, at 218, until credit is added to the account, at which time the processing device will again determine an estimated remaining utility usage at 204.

Figure 3:
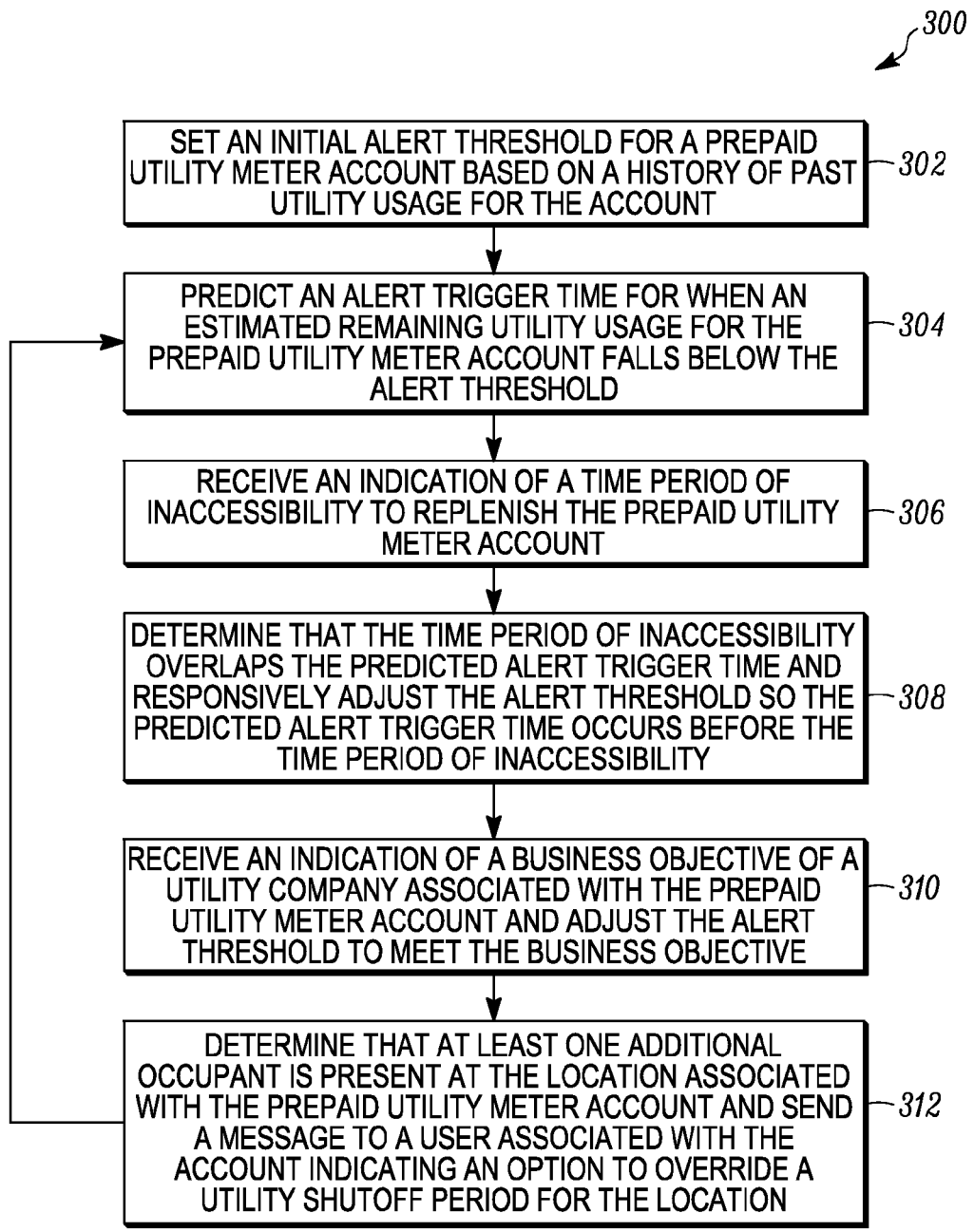
FIG. 3 is a logical flowchart illustrating a method for determining and adjusting an alert threshold for a prepaid utility meter account in accordance with an embodiment of the present teachings.

FIG. 3 shows a logical flowchart 300 illustrating a method for determining and adjusting the alert threshold referenced at 212 in FIG. 2 for the prepaid utility meter account. In an embodiment in accordance with the present teachings herein, the processing device of the prepaid utility meter system 100 determines the alert threshold based on a set of future events comprising at least one of: a calendared event comprising an upcoming time period of absence of at least one occupant from a location being serviced by the utility system; an upcoming time period when facilities that are used to replenish a prepaid utility meter account associated with the utility system are closed; a business objective comprising a utility company, associated with the utility system, shifting revenue between a current accounting period and a next accounting period; input data from presence or proximity sensors of a residence or an establishment, or a weather forecast. While only a limited number of future events are explicitly indicated, the system 100 can make use of additional such events to determine and adjust the alert threshold.

More particularly, FIG. 3 shows the processing device of the prepaid utility meter system 100 setting an initial alert threshold for the prepaid utility meter account at 302. The alert threshold sets a number of days left of estimated utility usage before utility shut-off, which corresponds or equates to an amount of credit left in a particular account. In an embodiment, that amount of credit remaining, which correlates to the alert threshold, is determined based on a history of past utility usage for the account. One objective of the alert threshold is to give the utility user notice of a low account balance while still providing the user with sufficient time to replenish the account.

The number of days of estimated remaining utility usage until utility shut-off, which correlates to the alert threshold, can be set in any number of ways. For example, a utility company administrator sets a default alert threshold for all utility accounts at seven days of estimated remaining utility usage left. Additionally, the user changes the seven-day default setting in favor of receiving a first alert notice when there are only five days of estimated remaining utility usage left. By using past utility usage patterns to predict current and future utility usage rates, the processing device estimates the credit amount in a particular utility account that equates to the number of remaining days of utility usage set by the alert threshold.

For instance, a first utility user sets the alert threshold at five remaining days of estimated utility usage until utility shut-off. If past utility usage patterns indicate that the first utility user consumes approximately 50 kilowatt hours (kWh) of electricity per day, the processing device sets the alert threshold credit amount by extrapolating that there are approximately five days of utility usage remaining when there is credit for 250 kWh left in the first user's prepaid utility meter account. Accordingly, different utility accounts that have the same alert threshold set (i.e., as corresponds to the same number of remaining days of utility usage) can equate to different remaining credit amounts. With further regard to the above example, a second utility user might have approximately five days of utility usage remaining when there is credit for 150 kWh left in the second user's prepaid utility meter account because of different past utility usage patterns. More complex calculations involve applying different utility usage rates for different times (e.g., weekdays vs. the weekend).

At 304, the processing device predicts an alert trigger time for when the estimated remaining utility usage for the prepaid utility meter account falls below the alert threshold. In contrast to the number of days of utility usage that remain after the alert threshold is reached, the alert trigger time relates to how many days of utility usage remain before the alert threshold is reached. Predicting the alert trigger time, as used herein, amounts to estimating the date on which the alert threshold will be reached. While days are referred to within this detailed description for explanatory purposes, it is noted that the processing device can perform the calculations described herein using other units of time (e.g., seconds, minutes, hours, etc.). In an embodiment, the processing device updates the predicted alert trigger time every time it performs the calculation indicated by 304.

At 306, the processing device within system 100 receives an indication of a time period of inaccessibility to replenish the prepaid utility meter account. A time period of inaccessibility is an interval of time during which a utility user cannot readily replenish his account. For example, a time period of inaccessibility may comprise a future time period when there are fewer or no occupants at a location being serviced by a prepaid utility meter associated with the prepaid utility meter account. For example, the utility user plans a trip for the future time period. Because the absence of one or more occupants from the location being serviced will likely affect the rate at which utility is consumed, the above example also represents a usage prediction event. The processing device is made aware of such events as indicated above by reference to FIG. 2.

A time period of inaccessibility may also comprise a future time period when facilities that are used to replenish the prepaid utility meter account are closed. Such closures might occur on holidays, weekends, scheduled electrical brownouts, or when remodeling is being done at a facility that serves a wide geographical area. This information can be compiled at the back-office 212 and made available to the processing device.

Figure 4:
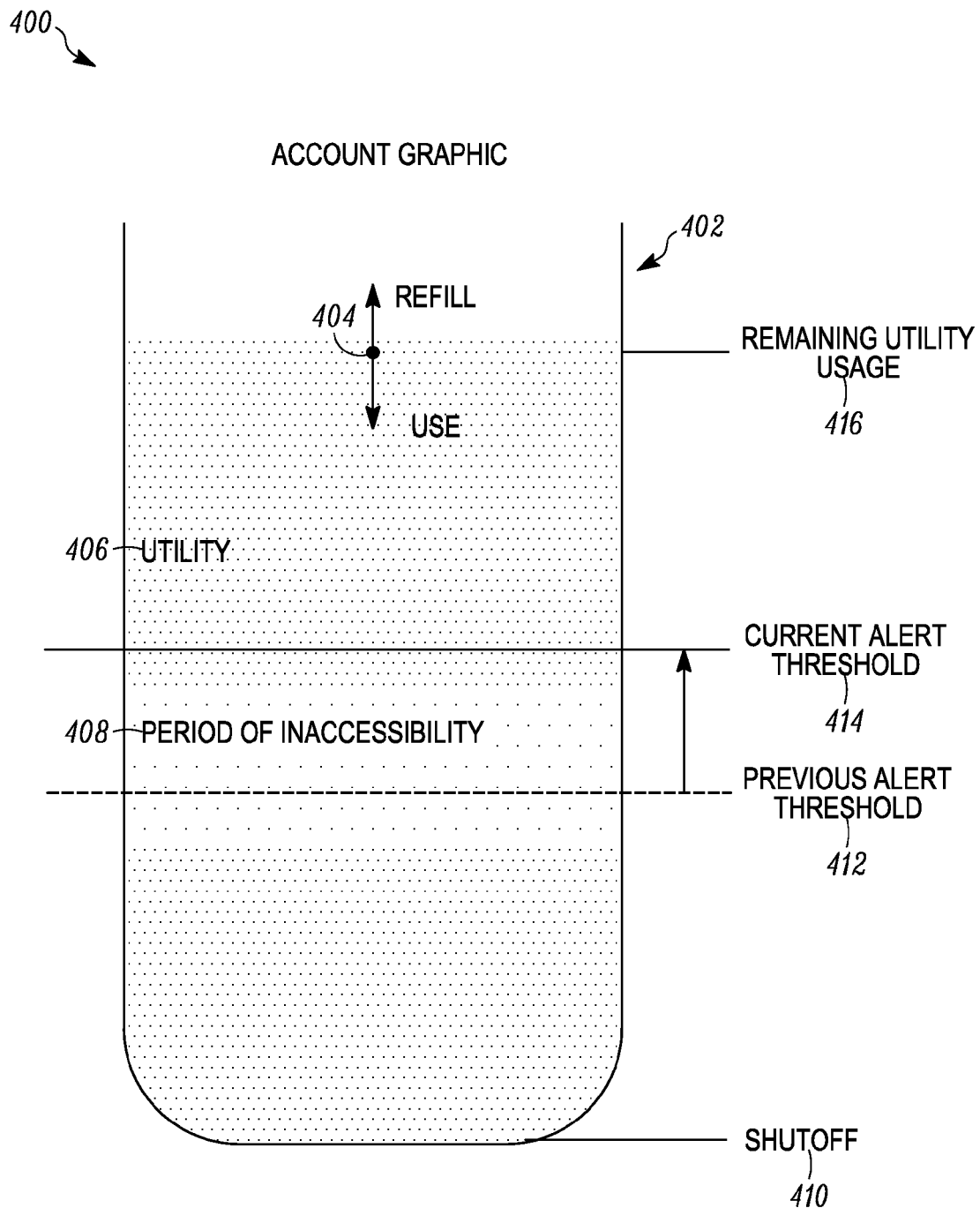
FIG. 4 a schematic diagram illustrating the adjusting of the alert threshold for a prepaid utility meter account in accordance with an embodiment of the present teachings.

At 308, the processing device determines that the time period of inaccessibility indicated at 306 overlaps the predicted alert trigger time, and it responsively adjusts the alert threshold so the predicted alert trigger time occurs before the time period of inaccessibility. Turning momentarily to FIG. 4, the account graphic shown and indicated at 400 is used to facilitate the explanation of the alert threshold adjustment made at 308. The vessel indicated at 402 represents the prepaid utility meter account which at any given time contains an amount of credit that translates into an amount of available utility, indicated by the dithered pattern at 406. As utility is consumed, or the utility account is replenished, the level of remaining utility usage 416 drops or rises, respectively, as indicated at 404. In an embodiment, the flow of utility is shut off if the level of remaining utility usage 416 drops to the shutoff level indicated at 410, which represents a depleted account. To prevent a disruption in utility serve, the prepaid utility meter system 100 sends an alert to the account holder as soon as it determines that the remaining utility usage level 416 has dropped below the current alert threshold shown at 414.

The band at 408 with the sparse dithering represents a period of inaccessibility when the account holder is expected to be unavailable to refill the account. The band is placed based on the graph of remaining utility based on the expected amount of future utility that will be used based on historical usage patterns. While utility is being consumed, the remaining utility usage level 416 drops, therefore, the height of the band at 408 is proportional to the length of time the account holder is expected to be unavailable, with the top edge of the band representing the time at which the account holder first becomes unavailable. As shown at 412, the previous alert threshold falls within the band 408 and thus within the period of inaccessibility. If the initial alert is sent to the account holder only after the remaining utility usage level 416 dropped below the previous alert threshold 412, the account holder would be unavailable to refill the account when the alert was received. For this reason, the processing device of the prepaid utility meter system 100 adjusts the alert threshold upward from 412 to 414 so the predicted alert trigger time occurs before the time period of inaccessibility. This provides the account holder the opportunity to replenish the account before his period of absence and minimizes the chance of the utility being shut off during the period of absence.

Returning to FIG. 3 and continuing the description of the method for adjusting the alert threshold shown at 300, the processing device receives at 310 an indication of a business objective of a utility company associated with the prepaid utility meter account and adjusts the alert threshold to meet the business objective. A business objective, as used herein, is an outcome or goal the utility company is trying to achieve. Of interest are those business objectives that materialize, at least in part, as a result of adjusting the alert thresholds for a set of prepaid utility meter accounts. In one embodiment, the business objective comprises increasing revenue for a current accounting period, and the alert threshold associated with each prepaid utility meter account in the set is increased so an automated alert message is sent during the current accounting period. In another embodiment, the business objective comprises shifting revenue to a next accounting period, and the alert threshold associated with each prepaid utility meter account in the set is decreased so the automated alert message is sent during the next accounting period. Having the ability to shift revenue between accounting periods gives the utility company some control over its tax liability and even its share price. An accounting period may be a year, a quarter, a month, or any other period of time.

Shifting revenue between accounting periods operates on the premise that account holders typically make payments to replenish their accounts within a short time after receiving their alert messages. If the predicted trigger time for a set of accounts falls within a time interval that contains the end of the current accounting period (which is also the beginning of the next accounting period), the account holders may be encouraged to make payments sooner or later by adjusting the alert thresholds up or down, respectively. In an example with monthly accounting periods, the predicted trigger time for an account as of July $15^{th}$ is August $2^{nd}$. The account holder receives an initial alert message on August $2^{nd}$ (or perhaps the $1^{st}$ or $3^{rd}$, depending on the accuracy of the prediction) and makes a payment to replenish his account on August $4^{th}$. Considering the same example again where the utility company decides to boost revenue for the current (i.e., July) accounting period, the system 100 increases the alert threshold by five days so that the predicted trigger time as of July $15^{th}$ is now July $28^{th}$. The account holder now receives the initial alert message on July $28^{th}$ (or perhaps on the $27^{th}$ or $29^{th}$), as opposed to August $2^{nd}$, and makes his payment by July $31^{st}$ before the end of the current accounting period.

At 312, the prepaid utility system determines that at least one additional occupant is present at the location associated with the prepaid utility meter account and sends a message to a user associated with the account indicating an option to override a utility shutoff period for the location. In a particular embodiment, the presence of the at least one additional occupant is determined by interfacing with a thermostat at a location associated with the prepaid utility meter account. The presence of extra people increases the temperature of a room which can be detected by the thermostat 104. In another embodiment, the presence of additional persons can also be determined by the presence of mobile devices in the locality, proximity or heat sensors, or by a query to the local computer 106 which has access to cameras of the location or other sensors. A utility shutoff period is a periodically occurring interval of time, arranged by contractual agreement with the utility company, when a utility-consuming system, such as an air conditioning or heating system, at a location being serviced by the utility company is shut down. For particularly hot periods during the summer months, for example, the utility company might offer reduced rates to incentivize customers to agree to a utility shutoff period for their air conditioners. By intermittently powering down air conditioners and staggering the shutoff periods for different locations, the utility company can reduce the peak load placed on its generators 110.

Figure 5:
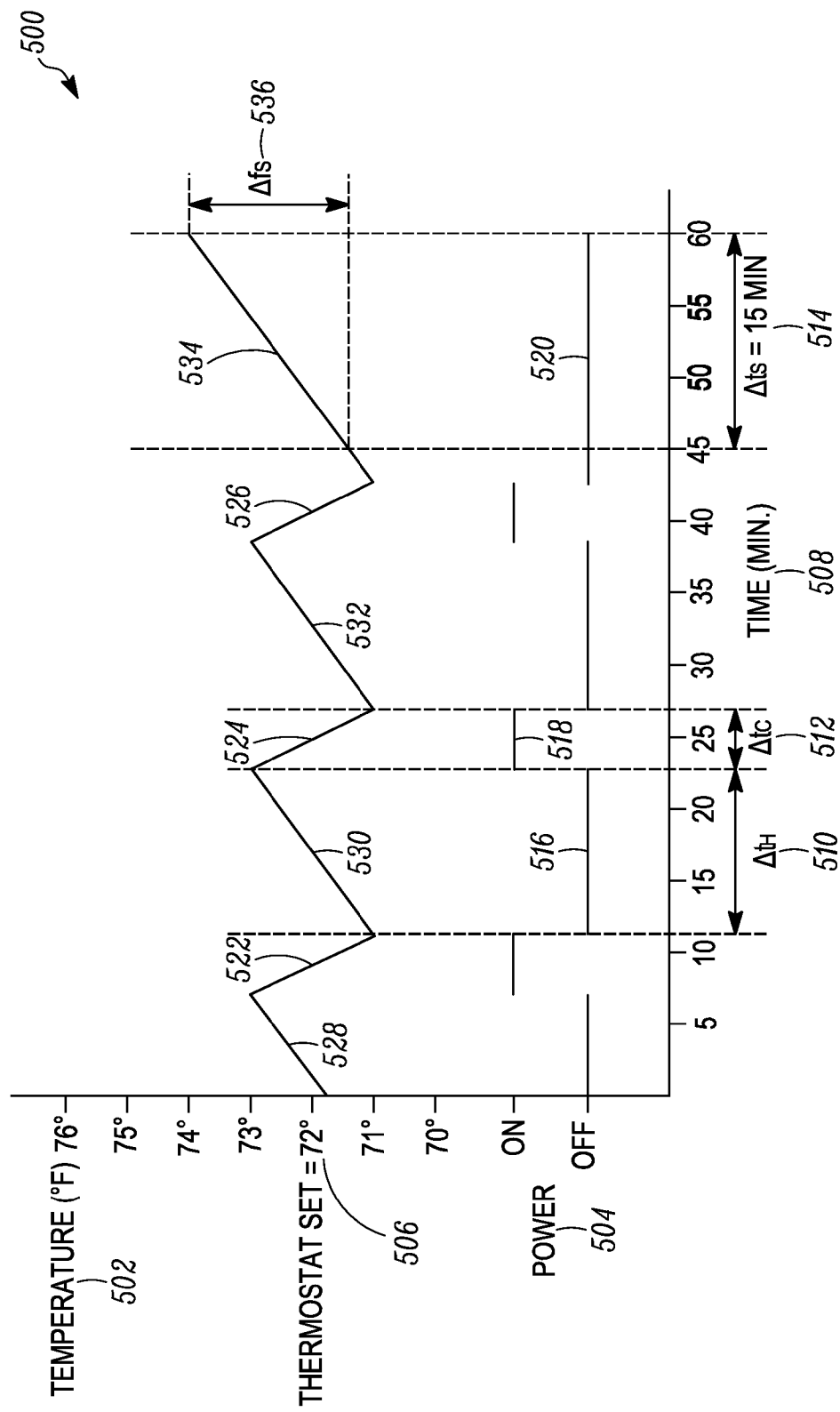
FIG. 5 is a plot illustrating a relationship between utility usage and climate control at a location serviced by a prepaid utility meter account.

Turning momentarily to FIG. 5, a plot 500 is shown illustrating the operation of an air conditioner in order to facilitate the explanation of how the prepaid utility meter system 100 might be triggered to send a message to a utility user that includes an option to override the utility shutoff period. Shown on the horizontal axis (i.e., abscissa) of the plot 500 at time 508 in units of minutes as measured from when the thermostat 104 is set. The time interval $\Delta t_S$ at 514 represents a 15-minute utility shutoff period which occurs at the end of every hour. Shown on the vertical axis (i.e., ordinate) of the plot 500 at temperature reading 502 is in degrees Fahrenheit, with a temperature of 72 degrees indicated at 506 as the temperature to which the thermostat is set. While units of minutes and Fahrenheit are used for these examples, alternate units, such as seconds and Celsius, can also be used. Additionally, shown on the vertical axis at 504, is a binary indication of whether the air conditioner is powered on or off.

At approximately 7 minutes, the temperature at the location being cooled by the air conditioner has climbed to 73 degrees while the air conditioner is off. This is one degree higher than the thermostat set temperature. The air conditioner then powers on and stays on until the location is cooled to 71 degrees, one degree lower than the thermostat set temperature. The air conditioner remains powered down (indicated at 516) for a time period $\Delta t_H$ indicated at 510, during which time the temperature rises by two degrees. At approximately 23 minutes, the air conditioner powers on (indicated at 518) for a time period $\Delta t_C$ indicated at 512, which is the amount of time it takes the air conditioner to cool the temperature by two degrees. This pattern continues until the utility shutoff period is reached at 45 minutes. At approximately 53 minutes, the temperature again reaches 73 degrees but the air conditioner is prevented from powering on during the utility shutoff period. At 60 minutes, the temperature reaches a maximum as the utility shutoff period ends and the air conditioner again begins to cool the location. The amount by which the temperature rises during the utility shutoff period is indicated by $\Delta f_S$ at 536.

In an embodiment, a processing element within the digital thermostat 104 compiles data represented in FIG. 5 and determines if the 15-minute shutoff period $\Delta t_S$ 514 is preventing the air conditioner from effectively cooling the location. Insufficient cooling may suggest that additional occupants are present. When the air conditioner is working harder against a larger temperature gradient or to remove additional heat, the drop (negative slope) of the cooling lines represented by 522-526 become shallower. The air conditioner must stay on longer after powering up (518) to bring the temperature down. The heating lines represented by 528-534, on the other hand, will become steeper (i.e., increased slope) as the location heats up faster after the air conditioner powers down (516). This results in the cooling interval $\Delta t_C$ 512 increasing as the heating interval $\Delta t_H$ 510 decreases. The increase in temperature $\Delta f_S$ 536 during the 15-minute shutoff period $\Delta t_S$ 514 when the air conditioner is turned off (520) and the maximum temperature reached at the end of the 15-minute shutoff period $\Delta t_S$ 514 also provide a measurement for how efficient the air conditioner is working.

By compiling the data, the system 100 can trigger further action on a number of conditions. A non-exhaustive list of trigger conditions might include exceeding a critical value for: the cooling interval $\Delta t_C$ 512, the reciprocal of the heating interval $\Delta t_H$ 510, the slope at 530, the reciprocal of the absolute value of the slope at 524, the quotient $\Delta t_C/\Delta t_H$, the ratio of the slope at 530 to the absolute value of the slope at 524, the change in temperature $\Delta f_S$, or the maximum temperature reached at the end of the utility shutoff period. In a particular embodiment, further action comprises the digital thermostat 104 sending the prepaid utility meter 102 an indication that the location is not effectively being cooled. Thereafter, the utility meter 102 verifies the presence of additional occupants at the location, by accessing sensors or a calendar, for example, before sending a message to the user associated with the prepaid utility meter account.

The message sent to the user indicates an option to override the utility shutoff period for the location. If the user chooses, for example if he is entertaining important guests, he can accept the option to override the shutoff period in exchange for paying a small premium. The air conditioner then has the ability to power on at any time, as needed, to keep the location at a comfortable temperature. In one embodiment, the user specifies how long the override is to remain in effect when electing the override option. For another embodiment, the override remains in effect until the user cancels it. In a further embodiment, the prepaid utility meter system 100 monitors one or more of the conditions indicated above and automatically cancels the override when the air conditioner can again effectively cool the location.

Returning now to FIG. 3, the actions indicated at 304-312 are performed repeatedly, as needed, to insure the alert threshold remains properly adjusted and that a utility-consuming system governed by a utility shutoff period is functioning effectively. At 306 and 310, for example, the processing device monitors for indications and takes the appropriate action when they are received. At 304, the predicted trigger time is updated continuously as the processing device acquires additional usage data and revised estimates for the remaining utility usage. Likewise, the processing device monitors the performance of a central air-conditioning system, for example, at 312 and alerts the user whenever the location associated with a prepaid utility meter account is no longer being effectively cooled while certain conditions are met.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, performed by a processing device included in a utility device, for automatically adjusting an alert threshold for a prepaid utility meter account, the method comprising the steps, implemented by the processing device, of:
   receiving an indication of a time period of inaccessibility to replenish a prepaid utility meter account;
   predicting an alert trigger time when an estimated remaining utility usage for the prepaid utility meter account falls below an alert threshold;
   determining that the time period of inaccessibility overlaps the predicted alert trigger time, and responsively adjusting the alert threshold such that the predicted alert trigger time occurs before the time period of inaccessibility; and
   sending an alert.

2. The method of claim 1, wherein the time period of inaccessibility comprises a future time period when there are fewer or no occupants at a location serviced by a prepaid utility meter associated with the prepaid utility meter account.

3. The method of claim 1, wherein the time period of inaccessibility comprises a future time period when facilities that are used to replenish the prepaid utility meter account are closed.

4. The method of claim 1, wherein the estimated remaining utility usage is determined based on past utility usage patterns associated with the prepaid utility meter account.

5. The method of claim 1, wherein the estimated remaining utility usage is determined based on forecasted weather.

6. The method of claim 1, wherein the estimated remaining utility usage is determined based on a future calendared event comprising at least one of:
   a time period when there are fewer or no occupants at a location serviced by a prepaid utility meter associated with the prepaid utility meter account; or
   a time period when at least one additional occupant is present at the location serviced by the prepaid utility meter associated with the prepaid utility meter account.

7. The method of claim 6, wherein an indication of at least one future calendared event is obtained by interfacing with a mobile device of a user associated with the prepaid utility meter account.

8. The method of claim 6, wherein an indication of at least one future calendared event is downloaded from the Internet.

9. The method of claim 1 further comprising:
   receiving an indication of a business objective for a utility company associated with the prepaid utility meter account, wherein the business objective comprises increasing revenue for a current accounting period; and
   adjusting the alert threshold so that the predicted alert trigger time occurs within the current accounting period.

10. The method of claim 1 further comprising:
   receiving an indication of a business objective for a utility company associated with the prepaid utility meter account, wherein the business objective comprises shifting revenue to a next accounting period; and
   adjusting the alert threshold so that the predicted alert trigger time occurs within the next accounting period.

11. The method of claim 1 further comprising:
   determining, by interfacing with a thermostat at a location associated with the prepaid utility meter account, that at least one additional occupant is present at the location; and sending a message to a user associated with the prepaid utility meter account, wherein the message indicates an option to override a utility shutoff period for the location.

12. A method, performed by a processing device included in a utility device, for automatically adjusting an alert threshold for a set of prepaid utility meter accounts, the method comprising the steps, implemented by the processing device, of:

receiving an indication of a business objective for a utility company;

determining a set of prepaid utility meter accounts, serviced by the utility company, each associated with an alert threshold that is used to trigger an automated alert message to replenish the prepaid utility meter account when an estimated remaining utility usage falls below the alert threshold;

automatically adjusting the alert threshold associated with each prepaid utility meter account in the set based on the business objective for the utility company; and sending the automated alert message.

13. The method of claim 12, wherein the estimated remaining utility usage is determined based on forecasted weather, and wherein the method further comprises increasing a first alert threshold in response to an indication of a period of absence of at least one occupant from a location associated with a first prepaid utility meter account, so that an automated message to replenish the first prepaid utility meter account is sent before the period of absence.

14. The method of claim 12, wherein the business objective comprises increasing revenue for a current accounting period, and the alert threshold associated with each prepaid utility meter account in the set is increased so the automated alert message is sent during the current accounting period.

15. The method of claim 12, wherein the business objective comprises shifting revenue to a next accounting period, and the alert threshold associated with each prepaid utility meter account in the set is decreased so the automated alert message is sent during the next accounting period.

16. The method of claim 1, wherein the utility device is a prepaid utility meter used to regulate a prepaid utility service associated with the prepaid utility meter account.

* * * * *